United States Patent [19]

Lewis

[11] 4,093,013
[45] June 6, 1978

[54] BIKE TRACTION ATTACHMENT

[76] Inventor: Nathanial H. Lewis, Box No. 20424, Pasadena, Calif. 90006

[21] Appl. No.: 580,320

[22] Filed: May 23, 1975

[51] Int. Cl.² ............................................. B60C 27/20
[52] U.S. Cl. .............................. 152/240; 152/225 R; 152/228
[58] Field of Search .............................. 152/223–233, 152/239–242, 221

[56] References Cited

U.S. PATENT DOCUMENTS

| | | | |
|---|---|---|---|
| 1,127,458 | 2/1915 | Lashar | 152/223 |
| 1,389,870 | 9/1921 | Henderson | 152/228 |
| 1,481,570 | 1/1924 | Toffey | 152/223 |
| 1,492,040 | 4/1924 | Lifquist | 152/223 |
| 1,566,938 | 12/1925 | Walty et al. | 152/228 |
| 1,788,857 | 1/1931 | Burkley | 152/221 |
| 1,824,545 | 9/1931 | Hodell | 152/221 |
| 1,859,656 | 5/1932 | Cunnington | 152/221 |
| 1,872,003 | 8/1932 | Pratt | 152/221 |
| 1,953,495 | 4/1934 | Nargi | 152/221 |
| 2,782,494 | 2/1957 | Gordon | 152/221 |
| 3,273,620 | 9/1966 | Phillips et al. | 152/228 |

Primary Examiner—Drayton E. Hoffman

[57] ABSTRACT

A bike traction attachment comprised of two identical side bands, between the bands are cleats secured at equal intervals around the bands' circumferences. Two hook-eyelet assemblies are incorporated as well, whereby, the side bands' ends can be secured together. And thereby, the traction attachment can be secured onto a tire of a bike.

2 Claims, 5 Drawing Figures

BIKE TRACTION ATTACHMENT

This invention will be a lightweight, compact, and practical accessory. And it is engineered and designed, to give a bike efficient and safe mobility over foul terrains. It is easy to mount or dismount, and easy to store when not in use. It is primarily for low speed and lightweight vehicles, such as bicycles, tricycles and motorized bicycles (MOPEDS).

The bike can be ridden over hard surfaces, without a tire being damaged by the cleats of the attachment. There will be no detrimental effects on the riding characteristics of the pneumatic tire, as well.

I remember years ago, as a bike rider in the Midwest of this country. A bike rider had to just about abandon his bike, at least for awhile; whenever the terrain became covered with even a thin layer of ice and/or snow. This was due to the hazardous conditions created. A traction attachment on a bike's rear tire, would enable a rider to travel over icy, snowy, and muddy terrains with efficiency and safety.

This bike traction attachment will comprise a sufficient number of U-shape traction cleats, chain- or cord-type side bands, and hook-eyelet assemblies all engineered and designed to fit around the circumference of a bike tire. And it will not interfere with parts or devices at the rear (or front) of the bike. All aspects of this attachment will be simple, relatively speaking.

An extensive analysis of related products and prior patents have shown that, this invention has the best compromise of practicalness, economy (in all respects), safety, and efficiency. And it has novelty all of its own.

The objects and advantages of this invention will become better understood hereinafter from a consideration of the specification with reference to the accompanying drawings forming part thereof, and in which like numerals correspond to like parts throughout the several views of the invention, and wherein.

Figure 1:
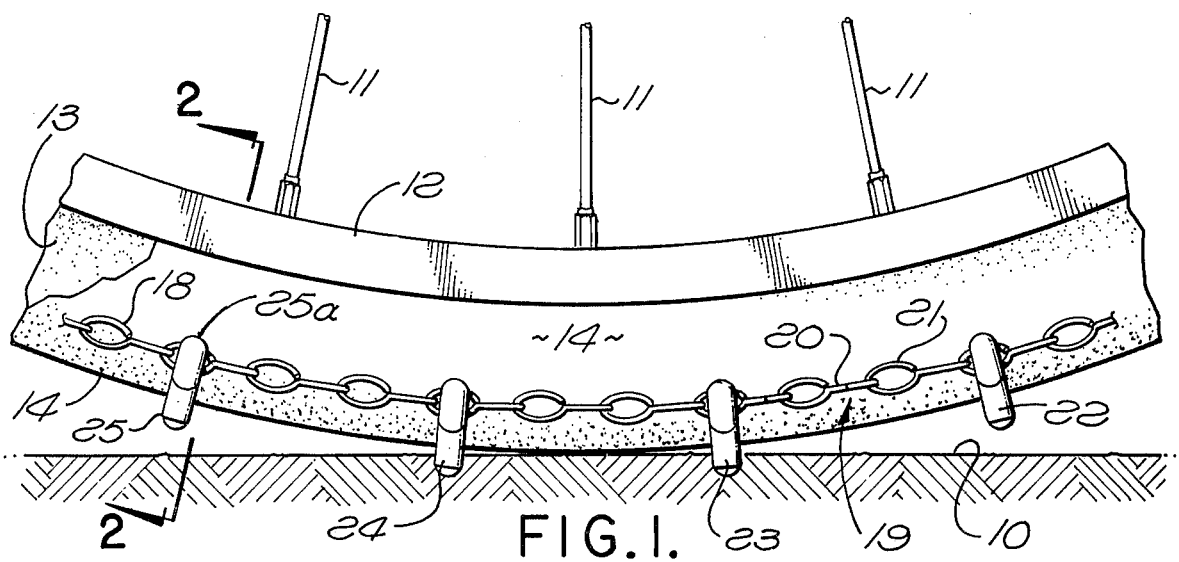
FIG. 1 is a fragmentary side view of a bike wheel assembly shown in combination with the traction attachment, and being supported by a surface.

Referring to FIG. 1, a fragmentary bike wheel assembly and traction attachment combination, rests on a soft surface 10. The wheel assembly comprises a series of spokes 11, a rim 12, and an inner tube 13 inside of a tire 14.

The bike traction attachment comprises two identical side bands, to which a sufficient number of rigid type cleats can be fastened. One of these side bands 18 is shown. The interval 19 containing a hook-eyelet assembly is where the side band 18 is secured together. This assembly comprises a hook 20 and an eyelet 21.

The small hook 20 and eyelet 21 can be painted so that it will be easier to locate. This is important when it comes time to dismount the attachment. Several cleats 22, 23, 24 and 25 are shown fastened to the fragmentary left side band 18, at equal intervals or nearly so.

An electro-galvanized, single type, steel jack chain of size No. 16 or 18 or 20 was found to be ideal for the side bands. This type of chain is not only relatively light and efficient as a side band 18, it has an excellent compromise of strength, low cost, flexibility, and availability.

Figure 2:
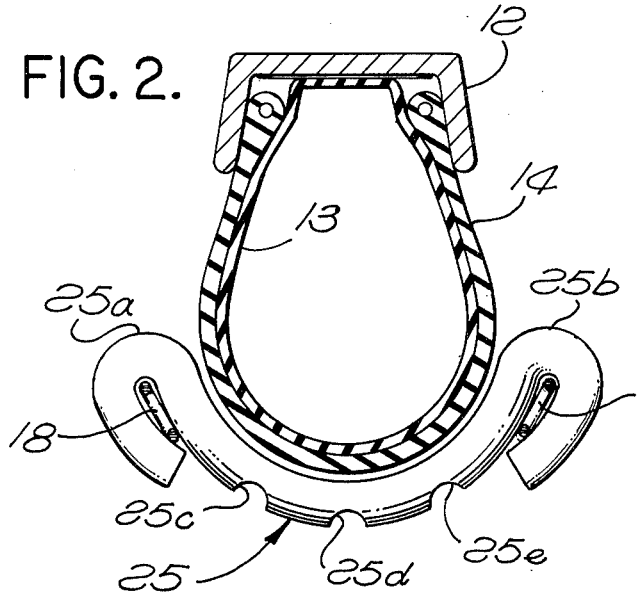
FIG. 2 is an enlarged sectional view, taken on the line 2—2 of FIG. 1, and with the surface omitted.

Referring to FIG. 2, each cleat will be identical to the one shown. The U-shape ends 25a and 25b are pressed down and around their respective side bands 18 and 26. Circular grooves 25c, 25d and 25e are shown at the bottom of the cleat 25, and they are equally spaced or nearly so. The tips of the ends 25a and 25b are very excellent in preventing lateral skidding. The reasons for this excellency are because the edges of the tips would dig into a soft surface, and their low positions to the sides give the tips and their edges an excellent advantage in preventing lateral skidding.

The cleat 25 should follow the lower contour of the tire 14, as close as is possible. The cleat ends 25a and 25b should be pressed as flat as is possible. Thereby, the cleat 25 will not rub excessively against any part of the bike or produce any excess noise when in motion.

Figure 3:
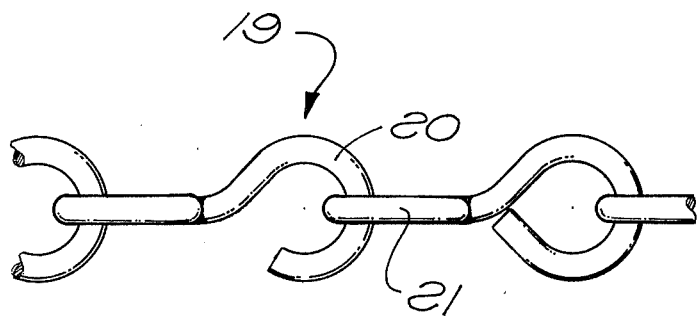
FIG. 3 is an enlarged, fragmentary top view of the hook-eyelet assembly, shown in FIG. 1.

Referring to FIG. 3, the assembly 19 has its hook 20 and eyelet 21 shown. The hook 20 could be replaced with an eyelet, the same as the eyelet 21 shown. A piece of cord or string could then be used to secure the two matching eyelets together. This would be an alternate fastening method for said traction attachment. A small bolt-nut combination can be used for greater security.

Figure 4:
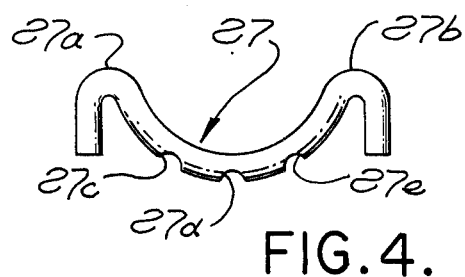
FIG. 4 is a front plan view of a single cleat, the rigid type, in its unmounted state and actual size.

Referring to FIG. 4, this compact cleat 27 is in its unmounted state, with open U-shaped ends 27a and 27b. The said cleat can have a circular or a triangular or a polygonal longitudinal cross section throughout. It is engineered and designed to fit, a one and one-fourth inches wide clincher-type tire, perfectly. Tight fitting cleats of this size will not interfere with any part of the bike provided the wheel assembly, to which the attachment is mounted onto, is properly centered in the bike's frame or fork.

Figure 5:
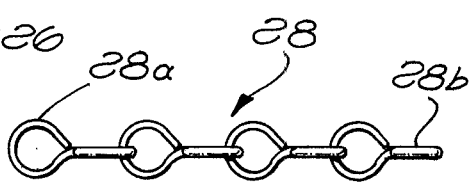
FIG. 5 is a front plan view of a single cleat, the non-rigid type, in its unmounted state and actual size.

The grooves 27c, 27d and 27e at the bottom of the cleat 27 will improve its traction ability. The circular shape of these grooves 27c, 27d and 27e gives them greater strength, than any other shape would provide. The depth of each groove 27c, 27d and 27e would be approximately one-fourth of the diameter of the cleat 27. Referring to FIG. 5, the cleat 28 is of the non-rigid type.

Both types of cleats were engineered and designed to fit one and one-fourth inches wide tires. This is the size used on most 10-speed and 27-inch bikes, which are the most popular and numerous ones, throughout the entire world. And these models are still increasing in number.

In most cases, one traction attachment mounted on the rear tire of a bike, will give sufficient traction for both good propulsion and braking. However, an additional one on the front tire, will increase the bike's ability to travel over slippery surfaces.

In snow or mud, that is ½ inch or greater in depth; the cleats ends and the side bands will increase the traction ability of the attachment.

The 27-inch tire will need forty-seven or forty-eight cleats, equally spaced (or nearly so) around its circumference, with each interval being approximately 1¾ inches. The two ends of the attachment are fastened together at the hook-eyelet interval. There will be a slack in the attachment of about ¼ to ½ inch. This slack will be needed so that, the hooks can be placed into each respective eyelet with some ease. But still the attachment will be secured onto the tire firmly.

The traction attachment cleats are held at equal intervals (or nearly so) around a tire perfectly, by the left and right side bands fastened at each respective hook-eyelet assembly. The force at the top of the tire is due to the weight of the attachment in this area; the force at the bottom of the tire is due to the tire pressing against the cleats in this area and the surface. These two vertical forces will help hold the attachment in place around the circumference of the tire.

In case of the rigid type cleats, a particular traction attachment can be so tailored; it will fit two different bike styles or models at least. The non-rigid type cleats such as chains of some particular design, are much easier to become entangled when dismounted. Considering everything, a traction attachment with rigid type cleats was found to be the best of the two types; it prevents lateral skidding the best, which is one of its many desirable features.

It will be a simple matter of laying the attachment in a straight line upon the ground. Next, pick up the bike and place one of its wheels in the center of the attachment. Then, join the two ends and fasten them together. Prototypes were built and tested.

Tires generally come in three types: the popular "clinchers", between 1¼ inches and 1¾ inches in width; "balloon clinchers" between 2 and 2¼ inches, and the "sewn type" used for racing, between ¾ inch and 1¼ inches.

Other versions of the said traction attachment can be engineered and designed to fit the above tire sizes, and motorized bicycles (MOPEDS) tires as well. In case of motorized bicycles (MOPEDS) which have fenders, or bicycles with fenders; a traction attachment is mounted by tying one end of the attachment in place onto a tire, with a piece of cord or string. Next, lift the vehicle off the ground a short distance and rotate the tire, until the attachment's two ends can be matched and fastened together.

Having thus described said invention, it is to be understood that certain modifications in the construction and arrangement of the parts thereof will be made, as believed necessary, without departing from the scope of the attached claims.

The following is claimed:

1. An improved traction attachment of the type having a plurality of cleats around the circumference of a tire, said cleats at some interval are held in place by a pair of side bands, a said cleat having a U-shape transverse cross-section and conforming to said tire, and having a longitudinal cross-section, that of a closed geometrical figure, wherein the improvement comprises:
   (a) the said cleat is a single unit throughout; and
   (b) U-shaped ends of said cleat, having said geometrical figure longitudinally cross-section throughout, said ends fastened around said side bands, each tip of each said end extends downward, a portion of each said tip is in contact with a horizontal plane through the lower curved portion of said cleat, thereby, each said tip prevents lateral skidding.

2. As claimed in claim 1, wherein; the said cleat having grooves along its bottom, thereby increasing traction ability.

* * * * *